(12) United States Patent
Lee et al.

(10) Patent No.: US 7,116,554 B2
(45) Date of Patent: Oct. 3, 2006

(54) HANDHELD ELECTRONIC DEVICE CRADLE WITH ENHANCED HEAT-DISSIPATING CAPABILITY

(75) Inventors: Jensen Lee, Sindian (TW); Yili Chen, Sindian (TW); Chil-Wei Tsai, Sindian (TW)

(73) Assignee: High Tech Computer, Corp., Tao Yuan (TW)

( * ) Notice: Subject to any disclaimer, the term of this patent is extended or adjusted under 35 U.S.C. 154(b) by 282 days.

(21) Appl. No.: 10/818,989

(22) Filed: Apr. 5, 2004

(65) Prior Publication Data
US 2005/0168191 A1    Aug. 4, 2005

(30) Foreign Application Priority Data
Feb. 2, 2004   (TW) .............................. 93201433 U

(51) Int. Cl.
*H05K 7/20* (2006.01)
(52) U.S. Cl. ............. 361/695; 361/687; 174/16.1; 165/80.3
(58) Field of Classification Search ........ 361/676–678, 361/687–690, 694–695; 174/16.1, 16.3; 165/80.3, 104.33, 122; 320/114, 115
See application file for complete search history.

(56) References Cited

U.S. PATENT DOCUMENTS

| | | | |
|---|---|---|---|
| 5,052,943 A * | 10/1991 | Davis | 439/357 |
| 5,230,016 A * | 7/1993 | Yasuda | 455/573 |
| 5,381,043 A * | 1/1995 | Kohiyama et al. | 307/116 |
| 6,356,054 B1 * | 3/2002 | Herrmann | 320/115 |
| 6,509,715 B1 * | 1/2003 | LaRue | 320/107 |
| 6,549,401 B1 * | 4/2003 | Lin et al. | 361/686 |
| 6,563,703 B1 * | 5/2003 | Xie | 361/687 |
| 6,645,666 B1 | 11/2003 | Moores, Jr. et al. | 429/120 |
| 6,657,654 B1 * | 12/2003 | Narayanaswami | 348/14.04 |
| 6,816,740 B1 * | 11/2004 | Lin | 455/573 |
| 6,926,130 B1 * | 8/2005 | Skowronski | 191/12.2 R |
| 2002/0094849 A1 | 7/2002 | Cannon et al. | |

FOREIGN PATENT DOCUMENTS

EP          1 217 710 A      6/2002

* cited by examiner

*Primary Examiner*—Boris Chervinsky
(74) *Attorney, Agent, or Firm*—J.C. Patents

(57) ABSTRACT

A handheld electronic device cradle (300) with heat-dissipating capability is provided. The cradle is used for charging a build-in battery in a handheld electronic device (380) and connecting the handheld electronic device to a host computer so that the handheld electronic device can exchange information with the host computer. The cradle comprises a casing (310), a fan-mounting seat (350) set up in the casing, an electrical fan (351) secured to the seat and a cable (314) for connecting the cradle with the host computer. An insertion slot (311) is provided in the casing. When the handheld electronic device is inserted into the insertion slot, the cradle charges the battery in the handheld electronic device and connects the handheld electronic device with the host computer. Furthermore, the handheld electronic device can communicate with other devices through a wireless network. Heat produced by the handheld electronic device during its insertion in the cradle can be removed by the fan, which generates an air flow blowing on a hot region of the handheld electronic device to take heat away therefrom.

21 Claims, 6 Drawing Sheets

HANDHELD ELECTRONIC DEVICE CRADLE WITH ENHANCED HEAT-DISSIPATING CAPABILITY

CROSS-REFERENCE TO RELATED APPLICATION

This application claims the priority benefit of Taiwan application serial no. 93201433, filed on Feb. 2, 2004.

BACKGROUND OF THE INVENTION

1. Field of the Invention

The present invention relates to a cradle for a handheld electronic device. More particularly, the present invention relates to a handheld electronic device cradle with enhanced heat-dissipating capability.

2. Description of the Related Art

In this information conscious society, our reliance on electronic products increases every day. Following our need for a higher communicating speed, better performance, a lighter device and a compact design, a variety of handheld electronic devices are out in the market. At present, the most common handheld electronic devices include cellular phones, smart phones and personal digital assistants (PDAs). Through these handheld electronic devices, communication is no longer restricted to the office. In fact, people can communicate with each other anywhere and at any time.

Through the increase in processing speed of CPUs (central processing units) and the development of Internet and wireless communication techniques, handheld electronic devices are no longer used mainly for single-purposed information processing. The handheld electronic devices are now often used as a converged device for performing wireless communication, connecting to Internet, playing games and serving as a multi-media unit. Because the handheld electronic device is usually powered by a rechargeable battery, battery capacity is a principal factor determining the duration of operation of the handheld electronic device. When the electrical power of the rechargeable battery runs out, the user usually puts the handheld electronic device on a cradle which is connected with a power supply, whereby the battery can be charged.

It should be noted that, during the charging of the battery, the temperature of the handheld electronic device will increase due to heat generated for charging the battery. The lift of the temperature of the handheld electronic device is exacerbated for a converged handheld electronic device, for example a smart phone, which has a variety of functions combined in a single device. When the smart phone is put on the cradle, it simultaneously executes data exchange with a host computer connected with the cradle, and wireless communication with other mobile phones through a cellular phone network, in addition to the work that the battery in the smart phone is charged by the cradle. Sometimes, the temperature increased may exceed the rated temperature limitation of the smart phone. When this happens, the smart phone is not able to function normally. Moreover, the temperature increased may cause the battery to overheat, which could lead to a disastrous explosion. Therefore, how to effectively remove heat generated by the handheld electronic device from the device when it is put on the cradle for charging its battery becomes an issue to handheld electronic device manufacturers.

SUMMARY OF THE INVENTION

Accordingly, an objective of the present invention is to provide a cradle for a handheld electronic device. The cradle can generate forced heat-dissipating air flow to cool down the temperature of the handheld electronic device mounted on the cradle for charging the battery of the device.

It is still an objective of the present invention to provide a cradle for a handheld electronic device. The cradle can generate an air flow flowing from an interior of the handheld electronic device to an interior of the cradle to thereby take away heat generated by the device when it is mounted on the cradle for charging the battery of the device.

It is a further objective of the present invention to provide a cradle for a handheld electronic device. The cradle can generate an air flow blowing toward a hot spot of a handheld electronic device seated on the cradle for battery charging.

To achieve these and other objectives and in accordance with the purpose of the invention, as embodied and broadly described herein, the invention provides a cradle for a handheld electronic device. The cradle provides electrical power to the handheld electronic device and connects the handheld electronic device to a host computer so that the handheld electronic device can exchange data with the host computer. The cradle also provides a forced air circulation to carry heat away from the handheld electronic device inserted in the cradle, thereby to prevent the handheld electronic device from overheating.

In a first embodiment, the handheld electronic device has a first connection port. The cradle mainly comprises a casing, a second connection port and an electrical fan. The casing has an insertion slot. The second connection port is set up in the insertion slot of the casing for engaging with the first connection port of the handheld electronic device. The electrical fan is set up within the casing and is electrically connected to a power supply. The electrical fan is an axial fan. The casing has at least a ventilation slot that permits air inside the casing to leave therefrom. The cradle further includes a sealing element and a third connection port. The sealing element is set up inside the casing around the second connection port for fittingly engaging a bottom of the handheld electronic device. The third connection port is set up on the casing for electrically connecting with the power supply. Furthermore, the third connection port is electrically connected with the second connection port and can charge a spare rechargeable battery. The cradle further comprises a data exchange module. The data exchange module is set up inside the casing and electrically coupled to the second connection port. The data exchange module connects with a host computer through an electrical cable extending from the cradle so that the handheld electronic device can exchange data with the host computer. In this embodiment, the bottom of the handheld electronic device has a heat-dissipating opening. The handheld electronic device further comprises a valve. The valve is a movable component capable of closing the heat-dissipating opening. When not inserted into the cradle, the valve closes the opening. When inserted into the cradle, the valve is activated the leave the opening so that the opening is opened to an interior of the cradle. The electrical fan is activated to generate an air flow following from an interior of the handheld electronic device to enter the interior of the cradle via the heat-dissipating opening. Then, the air flow flows out of the cradle via the ventilation slot provided in the casing of the cradle. Thus, heat generated by the handheld electronic device during insertion in the cradle can be effectively dissipated.

In a second embodiment of the present invention, the cradle has an outer casing having an air inlet, an air outlet and an insertion slot. A fan-mounting seat is set up inside the outer casing and a blower type electrical fan is fastened to the fan-mounting seat. The cradle further comprises a cable for connecting with a host computer. When the handheld electronic device is plugged into the insertion slot, the cradle provides power to charge a rechargeable battery inside the handheld electronic device. Furthermore, the cradle provides a connection for exchanging data between the handheld electronic device and the host computer. Meanwhile, the electrical fan is activated to draw air into the cradle through the air inlet. The air entering the cradle is then blown out of the cradle through the air outlet and finally impinges at a region of an outer surface of the handheld electronic device where the battery of the handheld electronic device neighbors so that most of the heat produced by the device during its insertion in the cradle can be effectively carried away.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
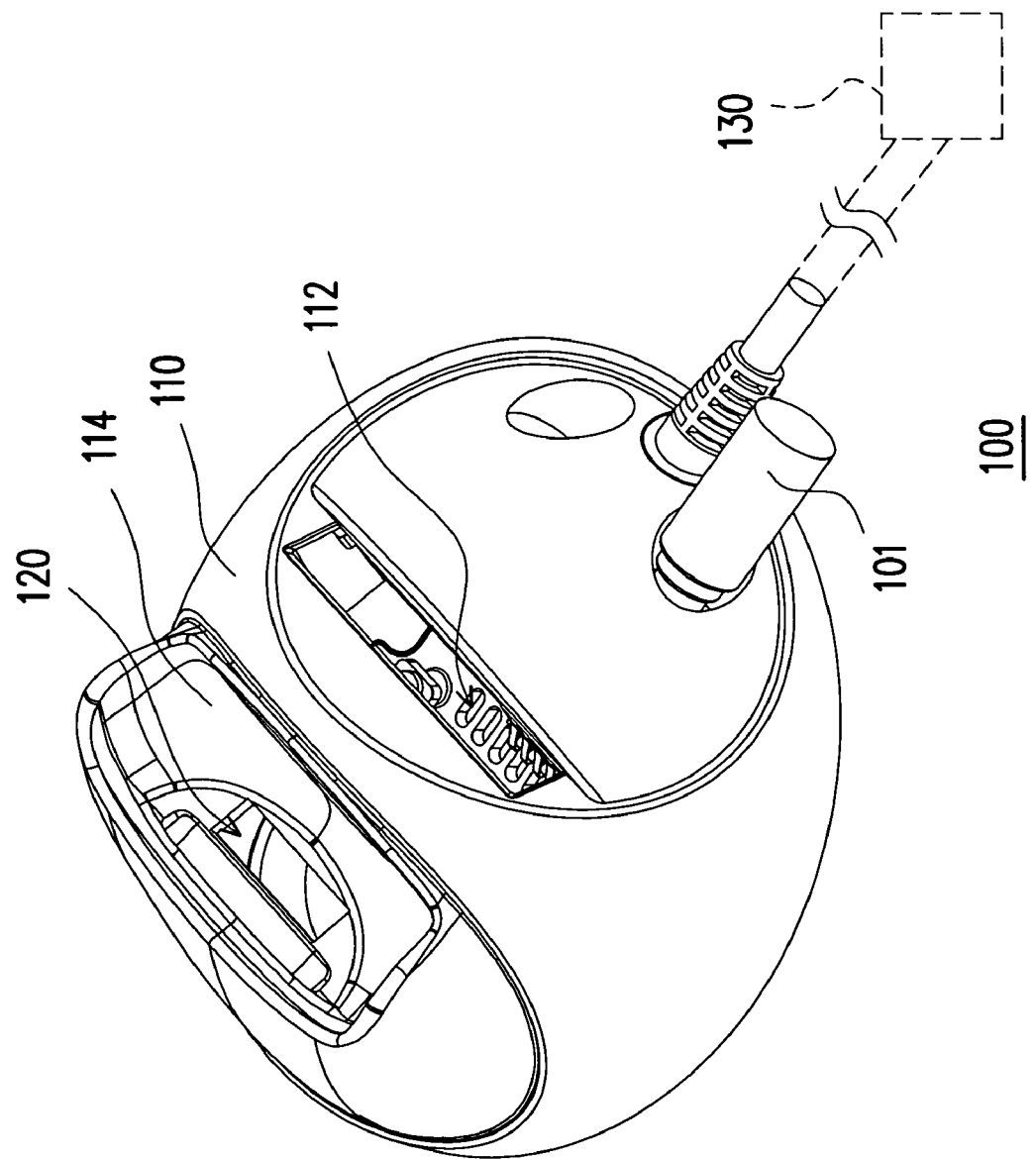
FIG. 1 is a perspective view showing a cradle for handheld electronic device according to a first preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
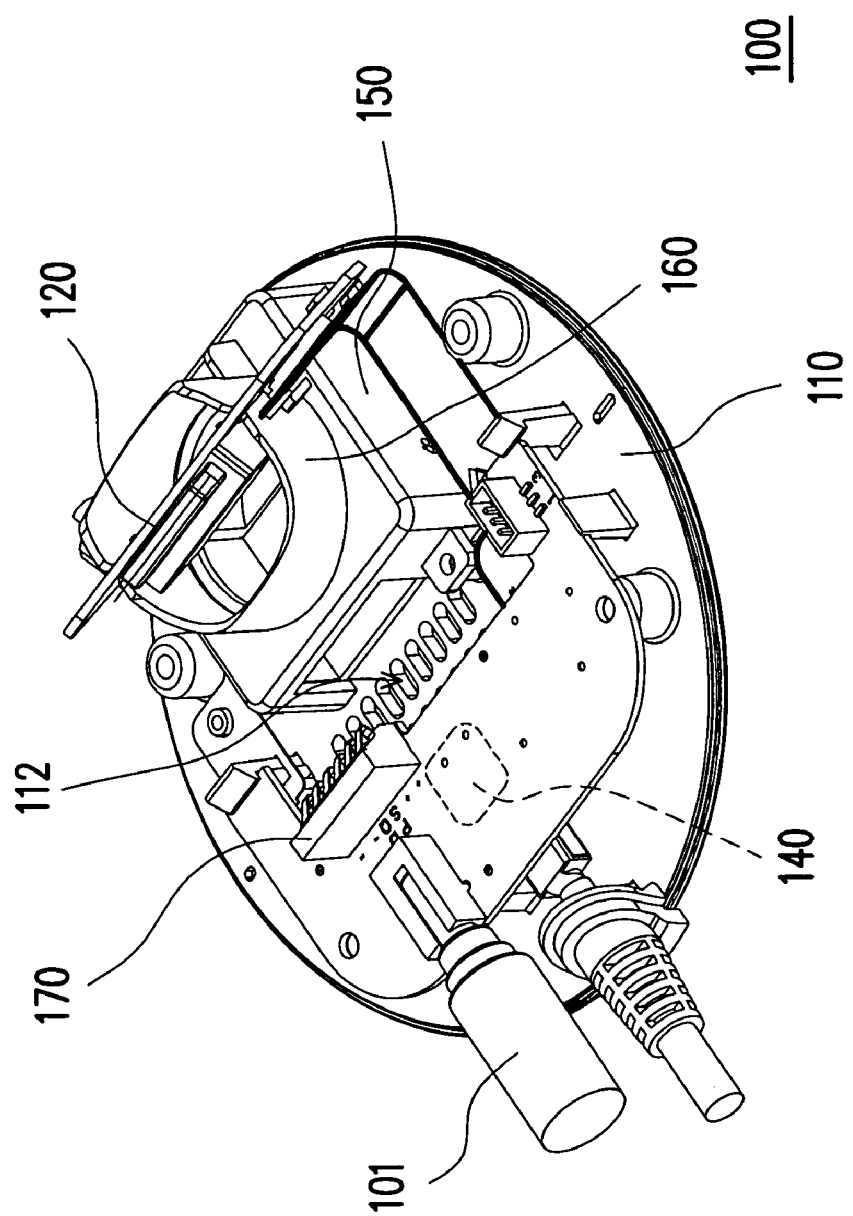
FIG. 2 is a perspective view showing an interior of the cradle of FIG. 1.
Figure 3:
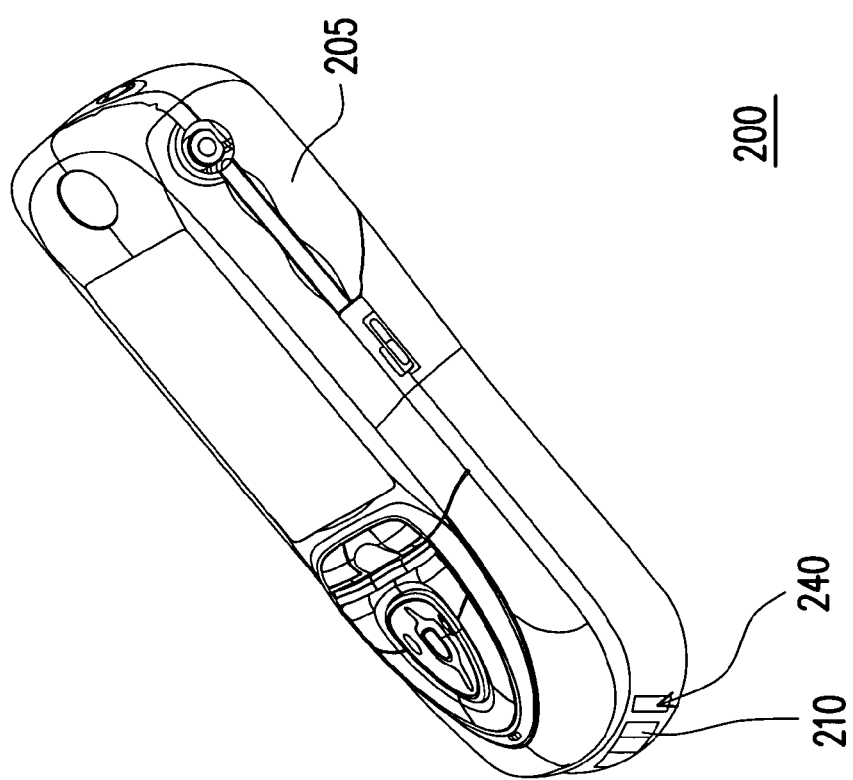
FIG. 3 is a perspective view showing a handheld electronic device for use with the cradle according to the first embodiment of the present invention.

FIG. 1 is a perspective view showing a cradle 100 for handheld electronic device according to a first preferred embodiment of the present invention. FIG. 2 is a perspective view showing that a casing 110 of the cradle 100 of FIG. 1 is removed so that an interior of the cradle 100 can be seen. FIG. 3 is a perspective view of a handheld electronic device 200 for use with the cradle 100. As shown in FIGS. 1 through 3, the cradle 100 mainly comprises the casing 110, a second connection port 120 and an electrical fan 150. In this embodiment, the cradle 100 provides electrical power to a handheld electronic device 200 for charging a battery (not shown) inside the handheld electronic device 200 and performing data exchange for the handheld electronic device 200 with a host computer (not shown) connected to the cradle 100 via a cable 101 of the cradle 100. The handheld electronic device 200 has a first connection port 210. The handheld electronic device 200 in the present embodiment is, for example, a smart mobile phone with data processing and wireless communication capabilities, which is a CDMA (Code-Division Multiple Access) smart phone in particular.

The casing 110 has an insertion slot 114 for accommodating the handheld electronic device 200. The second connection port 120 is set up inside the insertion slot 114 of the casing 110 for engaging with the first connection port 210 of the handheld electronic device 200 and electrically connecting to an external power supply 130. The power supply 130 is a common indoor AC/DC adapter for connecting with an AC socket. When the handheld electronic device 200 is plugged into the insertion slot 114, the second connection port 120 is electrically connected to the first connection port 210 for charging the rechargeable battery inside the handheld electronic device 200.

The cradle 100 further comprises a data exchange module 140 set up inside the casing 110 and electrically connected to the second connection port 120. The data exchange module 140 is connected to a host computer through the electrical cable 101 having a universal serial bus (USB) connector (not shown) or other type connector that can electrically connect with the host computer. The host computer can be a notebook computer or a desktop computer.

It should be noted that all the functions (including wireless communication) provided by the handheld electronic device 200 can operate normally without any overheating when the handheld electronic device 200 is plugged into the insertion slot 114 of the cradle 100 to charge the battery and perform data exchange and wireless communication.

The electrical fan 150 is set up inside the casing 110 and electrically connected to the power supply 130 for cooling the handheld electronic device 200. The fan 150 in this embodiment is a mass flow axial fan for drawing hot air from the handheld electronic device 200. The casing 110 has at least a ventilation slot 112 to provide the cradle 110 with an air outlet. The ventilation slot 112 is positioned close to the second connection port 120 so that heat can be directly removed from the handheld electronic device 200. An activation of the fan 150 forms an air flow to flow from an interior of the handheld electronic device 200 into the interior of the casing 100. Then the air flow leaves the interior of the casing 100 via the ventilation slot 112. Hence, heat produced by the handheld electronic device 200 during its insertion in the cradle 100 is carried away. The heat is generated mainly by an operation of a CPU (not shown) and the charging of the battery of handheld electronic device 200.

To enhance the heat dissipating capability of the fan 150 for drawing heat away from the handheld electronic device 200, the cradle 100 further comprises a sealing element 160. The sealing element 160 is set up inside the casing 110 around the second connection port 120. When the first connection port 210 of the handheld electronic device 200 is coupled to the second connection port 120, the sealing element 160 fittingly engages a bottom of the handheld electronic device 200 around the first connection port 210. Hence, the air flow generated by the fan 150 can effectively draw the hot air in the interior of the handheld electronic device away therefrom. The sealing element 160 is fabricated using an elastic material such as rubber.

Figure 4:
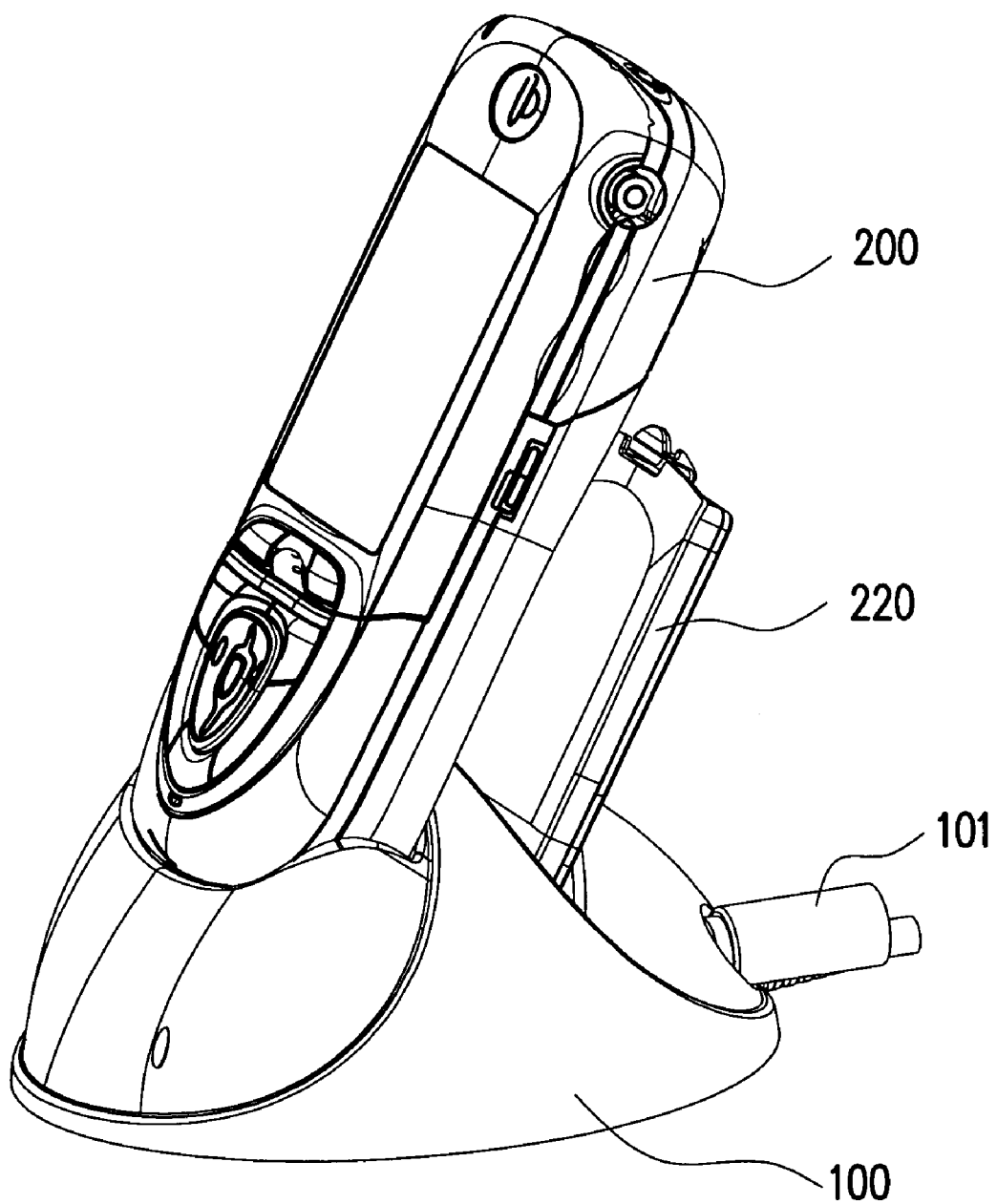
FIG. 4 is a perspective view showing the cradle of the first embodiment with the handheld electronic device of FIG. 3 and a spare rechargeable battery inserted therein.

FIG. 4 is a perspective view showing a handheld electronic device 200 and a spare rechargeable battery 220 inserted into the cradle 100 according to the first preferred embodiment of the present invention. As shown in FIGS. 2 and 4, the cradle 100 further comprises a third connection port 170. The third connection port 170 is set up on the casing 110 and electrically connected to the power supply 130. Furthermore, the third connection port 110 is electrically connected to the spare rechargeable battery 220 for recharging the spare rechargeable battery 220. Hence, the cradle 100 can provide electrical power to charge the spare rechargeable battery 220 and the built-in battery inside the handheld electronic device 200 in addition to providing the electrical power necessary for the handheld electronic device 200 to perform the data exchange operation with the host computer and wireless communication with other wireless device via a wireless communication network.

As shown in FIGS. 2 and 3, the handheld electronic device 200 has an outer casing 205 with a heat-dissipating opening 240 therein. The first connection port 210 is set up in the bottom of the outer casing 205, and used for connecting with the second connection port 120 in the cradle 100. When the handheld electronic device 200 is inserted into the cradle 100, the air flow generated by the fan 150 draws the hot air in the handheld device out via the opening 240.

Figure 5:
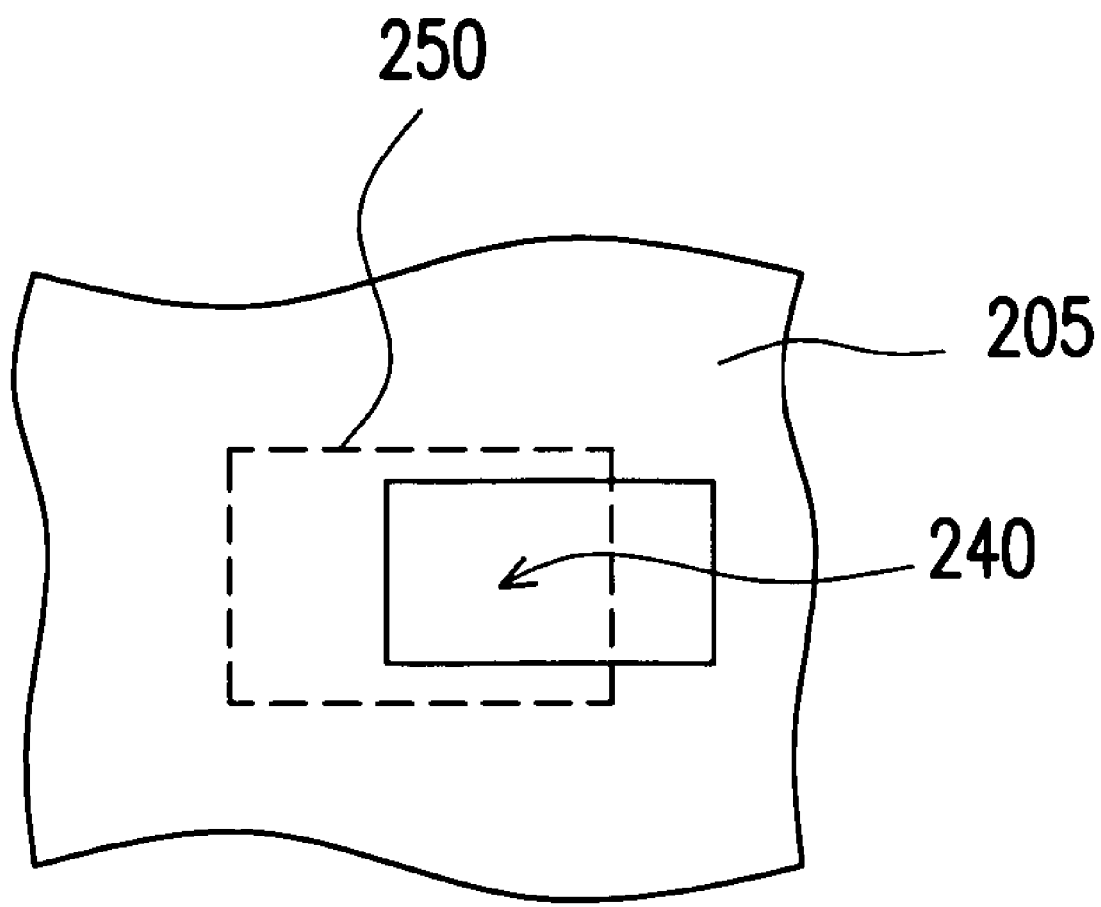
FIG. 5 is a partially enlarged view of a bottom of the handheld electronic device of FIG. 3 showing a heat dissipation opening thereof.

FIG. 5 is a partially enlarged view of the bottom of the outer casing 205 of the handheld electronic device 200 shown in FIG. 3. As shown in FIG. 5, the handheld electronic device 200 further comprises a valve 250. The valve 250 is a movable flap mounted on the outer casing 205. The valve 250 is devised to open or block the heat-dissipating opening 240. In normal use when the handheld electronic device 200 is not inserted in the cradle 100, the valve 250 covers the heat-dissipating opening 240 to prevent dust and dirt from entering the handheld electronic device 200. The cradle 100 has a valve-opening element (not shown) for opening the valve 250 when the handheld electronic device 200 is placed in the cradle 100. In this embodiment, the valve 250 is a spring-loaded, pivotably connected door, and the valve-opening element is a post. When the handheld electronic device 200 is inserted into the cradle 100, the valve-opening element pushes the valve upwardly to open the opening 240 so that the interior of the handheld electronic device communicates with the interior of the cradle.

Figure 6:
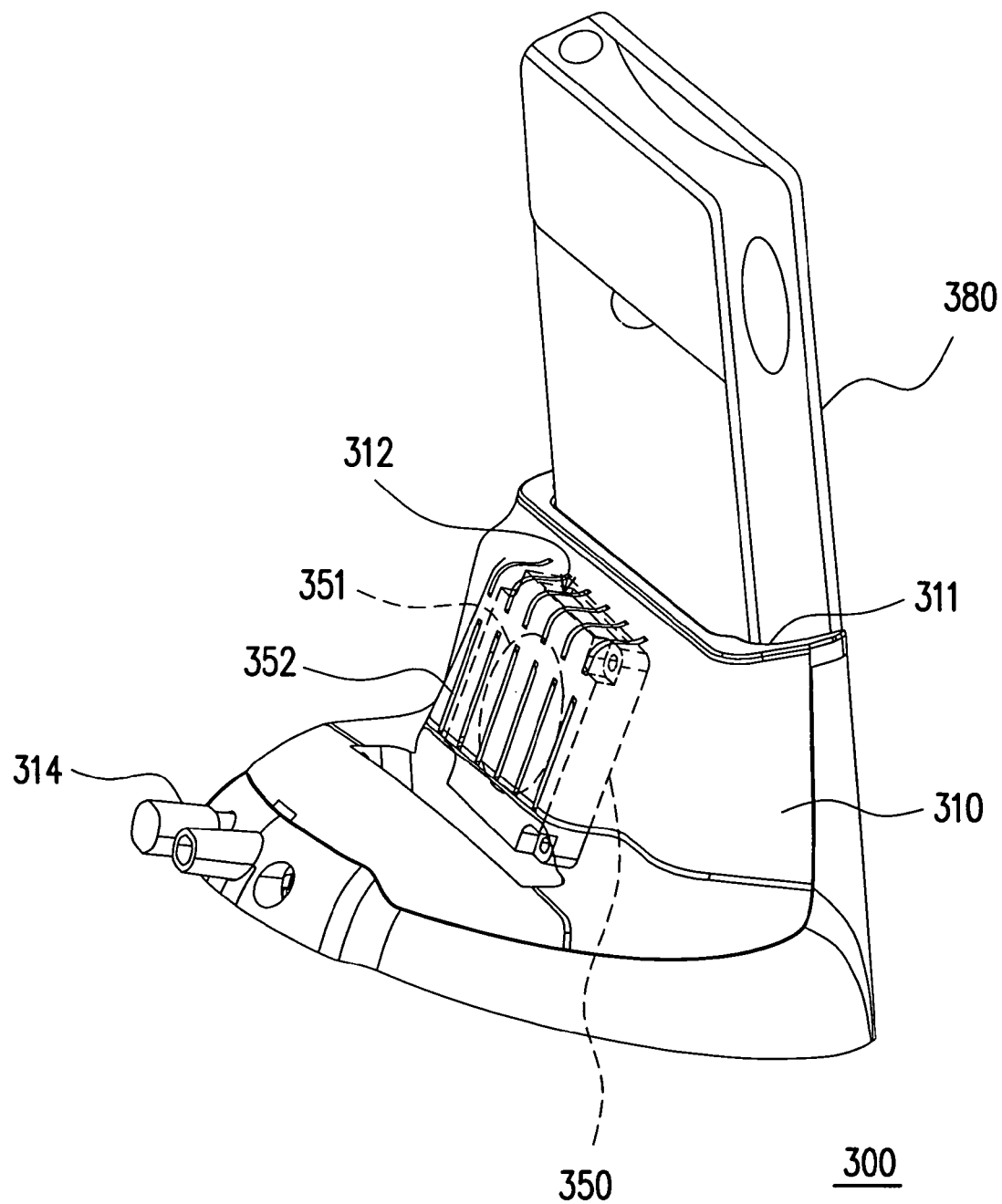
FIG. 6 is a perspective view showing a cradle for handheld electronic device according to a second embodiment of the present invention, wherein a handheld electronic device is inserted in the cradle.

FIG. 6 is a perspective view showing a handheld electronic device 380 plugged into a cradle 300 according to a second preferred embodiment of the present invention. As shown in FIG. 6, the cradle 300 has a casing 310 with an insertion slot 311 and a cable 314 for connecting with a host computer (not shown). The handheld electronic device 380 is inserted into the insertion slot 311. The cradle 300 charges a built-in battery (not shown) inside the handheld electronic device 380 and connects the handheld electronic device 380 with the host computer to perform data exchange. In the meantime, the handheld electronic device 380 also communicates with other electronic devices by wireless communication. The casing 310 has substantially vertically oriented air inlet slots 352 facing rearwards and substantially horizontally oriented air outlet slots 312 facing upwards. The air inlet slots 352 and the air outlet slots 312 are generally perpendicular to each other. A fan-mounting seat 350 is set up in the casing 310 between the air inlet slots 352 and the air outlet slots 312. An electric fan 351, for example, a blower type fan is fixed to the fan-mounting seat 350. When the fan 351 is activated, the fan 351 generates an air flow that enters the cradle 300 via the air inlet slots 352 and leaves the cradle 300 via the air outlet slots 312. After leaving the outlet slots 312, the air flow impinges at a region of a rear side of handheld electronic device 380 where the built-in battery of the handheld electronic device 380 neighbors. Thus, heat generated by handheld electronic device 380 during its insertion in the cradle 380 can be carried away by the air flow.

It should be noted that the handheld electronic devices 200, 380 in the two embodiments are prevented from performing some functions, like the wireless communication, if the handheld electronic devices are not charged by the cradles 100, 300, but by a traveling charger which does not have the forced-air cooling ability of the cradles according to the present invention.

In conclusion, the invention provides a cradle with an electric fan for producing a forced air circulation. Through the forced air circulation, heat produced by any handheld electronic device placed in the cradle is rapidly carried away so that the worry that the device may be damaged due to too heat can be ceased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A cradle for charging a battery in a handheld electronic device having a first connection port and wireless communication capability, the cradle comprising:
   a casing defining an insertion slot for receiving the handheld electronic device;
   a second connection port set up in the insertion slot of the casing for coupling with the first connection port of the handheld electronic device and electrically connecting to a power supply; and
   an electric fan set up inside the casing and electrically connected to the power supply for generating an air flow to dissipate heat away from the handheld electronic device when the handheld electronic device is received in the insertion slot.

2. The cradle of claim 1, wherein the electric fan is an axial for generating an air flow flowing from the insertion slot through the electrical fan.

3. The cradle of claim 2, wherein the casing further comprises at least a ventilation slot through which the air flow leaves the cradle.

4. The cradle of claim 1, wherein the cradle further comprises a sealing element set up inside the casing around the second connection port for fittingly engaging a bottom of the handheld electronic device around the first connection port.

5. The cradle of claim 1, wherein the cradle further comprises a third connection port set up in the casing for electrically connecting to the power supply and a spare rechargeable battery.

6. The cradle of claim 1, wherein the cradle further comprises a data exchange module set up inside the casing and electrically coupled to the second connection port for connecting the second connection port with an external host computer.

7. A cradle with an inserted handheld electronic device, the cradle being used for charging a built-in battery inside the handheld electronic device and connecting with a host computer to perform data exchange between the handheld electronic device and the host computer, comprising:
a casing having an insertion slot, wherein the handheld electronic device is inserted into the insertion slot and has wireless communication capability;
an electric cable for connecting to the host computer; and
an electric fan located within the casing for generating an air flow through the handheld electronic device to thereby carry heat generated by the handheld electronic device away therefrom.

8. The cradle of claim 7, wherein the air flow blows onto an outer casing of the handheld electronic device.

9. The cradle of claim 8, wherein the casing of the cradle further comprises an air inlet slot and an air outlet slot oriented in a direction substantially perpendicular to that of the air inlet slot, the air flow generated by the electric fan causing air to enter the cradle through the air inlet slot and leave the cradle to blow onto the handheld electronic device through the air outlet slot.

10. The cradle of claim 9, wherein the air flow blows over a region of the outer casing of the handheld electronic device where the built-in chargeable battery neighbors.

11. The cradle of claim 10, wherein the air flow blows onto a rear surface of the outer casing of the handheld electronic device.

12. The cradle of claim 7, wherein the air flow cause air to flow from an interior of the handheld electronic device into an interior of the cradle.

13. The cradle of claim 12, wherein the casing of the cradle has a ventilation slot, and the air flow from the handheld electronic device into the cradle leaves the cradle through the ventilation slot.

14. The cradle of claim 13, wherein the casing of the cradle further comprises a sealing element set up around the insertion slot and fittingly engaging a bottom end of the handheld electronic device.

15. The cradle of claim 14, wherein the bottom end of the handheld electronic device comprises a heat-dissipating opening.

16. The cradle of claim 15, wherein the bottom end of the handheld electronic device further comprises a valve for blocking the heat-dissipating opening when the handheld electronic device is moved from away from the cradle.

17. A cradle for a handheld electronic device, comprising:
a casing defining an insertion slot for accommodating the handheld electronic device, wherein the handheld electronic device has wireless communication capability; and
an electric fan set up within the casing for generating an air flow to remove heat generated by the handheld electronic device when the handheld electronic device is inserted into the insertion slot.

18. The cradle of claim 17, wherein the air flow flows into an interior of the casing from the insertion slot.

19. The cradle of claim 17, wherein the air flow blows towards a position above the insertion slot.

20. The cradle of claim 18, wherein the cradle comprises an electric cable for connecting with a host computer so that the handheld electronic device can exchange data with the host computer.

21. The cradle of claim 19, wherein the cradle comprises an electric cable for connecting with a host computer so that the handheld electronic device can exchange data with the host computer.

* * * * *